(12) United States Patent
Hao

(10) Patent No.: US 9,798,404 B2
(45) Date of Patent: Oct. 24, 2017

(54) TOUCH PANELS AND THE DRIVING METHOD THEREOF

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventor: Sikun Hao, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 211 days.

(21) Appl. No.: 14/762,460

(22) PCT Filed: Jun. 30, 2015

(86) PCT No.: PCT/CN2015/082820
§ 371 (c)(1),
(2) Date: Jul. 21, 2015

(87) PCT Pub. No.: WO2016/201727
PCT Pub. Date: Dec. 22, 2016

(65) Prior Publication Data
US 2017/0139534 A1    May 18, 2017

(30) Foreign Application Priority Data

Jun. 16, 2015 (CN) .......................... 2015 1 0334703

(51) Int. Cl.
*G06F 3/041* (2006.01)
*G09G 3/36* (2006.01)
(Continued)

(52) U.S. Cl.
CPC ........ *G06F 3/0412* (2013.01); *G02F 1/13338* (2013.01); *G02F 1/13452* (2013.01);
(Continued)

(58) Field of Classification Search
CPC .................................................... G06F 3/0412
See application file for complete search history.

(56) References Cited

U.S. PATENT DOCUMENTS 7,365,562 B2 * 4/2008 Jeon ..................... G02F 1/13454
324/760.01
7,515,122 B2 * 4/2009 Miller ................... G09G 3/3216
315/169.3
(Continued)

*Primary Examiner* — Patrick F Marinelli
(74) *Attorney, Agent, or Firm* — Andrew C. Cheng

(57) ABSTRACT

A touch panel and a driving method are described in the present disclosure. A driving chip is arranged within a chip area of a non-display area. The driving chip includes a plurality of pins. At least a portion of the pins outputs first driving signals for controlling the pixel electrodes, and outputs second driving signals for controlling the touch sensor. A plurality of wirings corresponding to the pins is arranged within the fan area, and the wirings transmit the first driving signals and the second driving signals outputted by the pins. In view of the above, the difficulties of the bonding manufacturing process are reduced. At the same time, the coupling capacitance between the wirings is reduced, and thus the display performance and the touch sensibility of the touch panel 10 are enhanced.

9 Claims, 5 Drawing Sheets

(51) Int. Cl.
*G06F 3/044* (2006.01)
*G02F 1/1333* (2006.01)
*G02F 1/1345* (2006.01)
*G02F 1/1343* (2006.01)
*G02F 1/1362* (2006.01)

(52) U.S. Cl.
CPC .. *G02F 1/133345* (2013.01); *G02F 1/134309* (2013.01); *G02F 1/136286* (2013.01); *G06F 3/044* (2013.01); *G06F 3/0416* (2013.01); *G09G 3/3685* (2013.01); *G02F 2001/134345* (2013.01); *G06F 2203/04103* (2013.01); *G06F 2203/04111* (2013.01)

(56) References Cited

U.S. PATENT DOCUMENTS

| | | | |
|---|---|---|---|
| 8,081,147 B2* | 12/2011 | Lee | G02F 1/13338 345/87 |
| 8,305,340 B2* | 11/2012 | Park | G06F 3/0421 345/104 |
| 8,427,435 B2* | 4/2013 | Takahashi | G06F 3/0416 345/173 |
| 8,760,412 B2* | 6/2014 | Hotelling | G06F 3/0412 345/173 |
| 8,854,334 B2* | 10/2014 | Shih | G06F 3/0412 345/173 |
| 8,872,797 B2* | 10/2014 | Lee | G06F 3/0412 345/175 |
| 9,557,839 B2* | 1/2017 | Cho | G09G 3/2003 |
| 2006/0109222 A1* | 5/2006 | Lee | G02F 1/13338 345/88 |
| 2006/0176285 A1* | 8/2006 | Lee | G02F 1/13338 345/173 |
| 2007/0046650 A1* | 3/2007 | Lee | G02F 1/13338 345/173 |
| 2007/0252614 A1* | 11/2007 | Jeon | G02F 1/13454 324/760.01 |
| 2009/0207333 A1* | 8/2009 | No | G02F 1/136259 349/54 |
| 2009/0295692 A1* | 12/2009 | Lee | G02F 1/13338 345/87 |
| 2011/0050645 A1* | 3/2011 | Lee | G06F 3/0412 345/175 |
| 2011/0074722 A1* | 3/2011 | Park | G06F 3/0421 345/173 |
| 2011/0096023 A1* | 4/2011 | Shih | G06F 3/0412 345/174 |
| 2013/0021298 A1* | 1/2013 | Seo | G06F 3/042 345/175 |
| 2014/0063023 A1* | 3/2014 | Baek | G09G 1/00 345/501 |
| 2015/0108480 A1* | 4/2015 | Xu | H01L 22/22 257/59 |
| 2015/0170565 A1* | 6/2015 | Hong | G09G 3/3233 345/212 |
| 2016/0055789 A1* | 2/2016 | Hashimoto | G09G 3/20 345/204 |
| 2016/0291784 A1* | 10/2016 | Zhai | G06F 3/0416 |
| 2017/0017325 A1* | 1/2017 | Tsai | G06F 3/0412 |

* cited by examiner

TOUCH PANELS AND THE DRIVING METHOD THEREOF

BACKGROUND OF THE INVENTION

1. Field of the Invention

The present disclosure relates to liquid crystal display technology, and more particularly to a touch panel and the driving method thereof.

2. Discussion of the Related Art

Liquid crystal displays (LCDs) are the most popular display devices been widely adopted by mobile phones, personal digital assistants (PDAs), digital cameras, and computers. With the development of the liquid crystal technology, consumers demand toward higher performance and better design, such as low cost and narrow border.

Touch technology has been greatly developed in recent years. A variety of touch technologies have been adopted during mass production. In-cell touch is one of the popular touch technology due to its integration and low cost. Conventional, two independent integrated circuit (IC) are configured, wherein one relates to in-cell touch, and the other one relates to driving the LCD. With the technology development, touch driving module and the LCD driving module have been integrated to one single IC, which not only reduces the bonding space, but also reduces the cost.

Currently, after the touch driving module and the LCD driving module have been integrated to one IC, the driving circuits of the touch driving module and the LCD driving module are independent. Specifically, ICs have been arranged on the substrate via chip on Glass (COG). As such, COG includes original output pins for touch functions and the output pins for driving LCD. This design increases the number of COG pins and the manufacturing difficulties of bonding. In addition, the touch wiring and the LCD wiring of the COG output may greatly overlap in the fan-out area, which may increase the coupling capacitance between the two wirings such that the display performance and the sensibility of the touch are affected. After passing through the fan-out area, the wirings enter the DE-MUX area. With the DE-MUX area, the wiring of the LCD increases from one to three, and are adopted in different time slots. After passing through the DE-MUX area, TP wirings then connects to the TP sensors in the display area.

SUMMARY

The object of the invention is to provide a touch panel and the driving method thereof for reducing the difficulties in bonding manufacturing process. In this way, the display performance and the touch sensibility are improved.

In one aspect, a touch panel includes: a display area and a non-display area, the display area including a plurality of pixel electrodes and touch sensors, the non-display area including a chip area, and a fan area, wherein: the chip area including a driving chip having a plurality of pins, at least a portion of the pins outputting first driving signals for controlling the pixel electrodes, and outputting second driving signals for controlling the touch sensor; a plurality of wirings corresponding to the pins being arranged within the fan area, and the wirings transmitting the first driving signals and the second driving signals outputted by the pins; the plurality of pins including at least one first pin and at least one second pin spaced apart from each other, the first pin only outputting the first driving signals, and the second pin outputting the first driving signals and the second driving signals in a time-sharing manner; the wirings including a first wiring and a second wiring respectively connecting to the first pin and the second pin for transmitting the driving signals outputted by the first pin and the second pin; a gap density between the first pin and the second pin being configured according to a touch sensibility of the touch panel, and a greater gap density being configured when the touch sensibility of the touch panel is higher; each of the pixel electrodes including a R-subpixel electrode, a G-subpixel electrode, and a B-subpixel electrode, the non-display area further including a multitask demultiplex area arranged at a side farther from the chip area, the first wiring and the second wiring passing through the fan area and entering the multitask demultiplex area, wherein within the multitask demultiplex area: each of the first wirings including three sub-wirings respectively connecting to the R sub-pixel electrode, the G sub-pixel electrode, and the B sub-pixel electrode so as to transmit the first driving signals to the R sub-pixel electrode, the G sub-pixel electrode, and the B sub-pixel electrode, respectively; each of the second wirings including four sub-wirings respectively connecting to the R sub-pixel electrode, the G sub-pixel electrode, the B sub-pixel electrode, and the touch sensor to respectively transmit the first driving signals to the R sub-pixel electrode, the G sub-pixel electrode, and the B sub-pixel electrode and to transmit the second driving signals to the touch sensor.

Wherein the multitask demultiplex area is configured with four control lines, including a R control line, a G control line, a B control line, a TP control line, and a plurality of transistors, a number of the transistors is the same with the number of the sub-wirings, wherein the R control line, the G control line, the B control line are configured to control a transmission of the first driving signals respectively to the R sub-pixel electrode, the G sub-pixel electrode, and the B sub-pixel electrode, and the TP control line is configured to control the transmission of the second driving signals, wherein: a first end of the transistors connects to one sub-wiring, and a control end of the transistors connects to the control line corresponding to the driving signals of the sub-wirings connected to the first end, and a second end of the transistors connects to the sub-pixel electrode or the touch sensor corresponding to the driving signals transmitted by the sub-wiring connected to the first end.

Wherein the first end of the transistor is a collector, the control end of the transistor is a base, and the second end of the transistor is an emitter.

Wherein the display area comprises a plurality of scanning lines and data lines, wherein the data lines are arranged above the scanning lines, a first insulation layer is arranged between the data line and the scanning line, and a second insulation layer is arranged above the data line; and the sub-wiring transmitting the second driving signals to the touch sensor is configured on the same layer with the scanning line, the touch panel further comprises a connecting line arranged on the same layer with the data line, the connecting line passes through a first through hole of the first insulation layer to connect with the sub-wiring transmitting the second driving signals to the touch sensor, and the connecting line passes through a second through hole of the second insulation layer to electrically connect with the touch-driving-signals line of the touch sensor.

Wherein the display area comprises a plurality of scanning lines and data lines, wherein the data lines are arranged above the scanning lines, a first insulation layer is arranged between the data line and the scanning line, and a second insulation layer is arranged above the data line; and the sub-wiring transmitting the second driving signals to the touch sensor is configured on the same layer with the data line, and the connecting line passes through a second through hole of the second insulation layer to electrically connect with the touch-driving-signals line of the touch sensor.

In another aspect, a touch panel includes: a display area and a non-display area, the display area including a plurality of pixel electrodes and touch sensors, the non-display area including a chip area, and a fan area, wherein: the chip area including a driving chip having a plurality of pins, at least a portion of the pins outputting first driving signals for controlling the pixel electrodes and outputting second driving signals for controlling the touch sensor; and a plurality of wirings corresponding to the pins being arranged within the fan area, and the wirings transmitting the first driving signals and the second driving signals outputted by the pins.

Wherein the plurality of pins including at least one first pin and at least one second pin spaced apart from each other, the first pin only outputs the first driving signals, and the second pin outputs the first driving signals and the second driving signals in a time-sharing manner; and the wirings comprises a first wiring and a second wiring respectively connecting to the first pin and the second pin for transmitting the driving signals outputted by the first pin and the second pin.

Wherein a gap density between the first pin and the second pin is configured according to a touch sensibility of the touch panel, and a greater gap density is configured when the touch sensibility of the touch panel is higher.

Wherein each of the pixel electrodes including a R-subpixel electrode, a G-subpixel electrode, and a B-subpixel electrode, the non-display area further comprises a multitask demultiplex area arranged at a side farther from the chip area, the first wiring and the second wiring pass through the fan area and enter the multitask demultiplex area, wherein within the multitask demultiplex area: each of the first wirings comprises three sub-wirings respectively connecting to the R sub-pixel electrode, the G sub-pixel electrode, and the B sub-pixel electrode so as to transmit the first driving signals to the R sub-pixel electrode, the G sub-pixel electrode, and the B sub-pixel electrode, respectively; each of the second wirings comprises four sub-wirings respectively connecting to the R sub-pixel electrode, the G sub-pixel electrode, the B sub-pixel electrode, and the touch sensor to respectively transmit the first driving signals to the R sub-pixel electrode, the G sub-pixel electrode, and the B sub-pixel electrode and to transmit the second driving signals to the touch sensor.

Wherein the multitask demultiplex area is configured with four control lines, including a R control line, a G control line, a B control line, a TP control line, and a plurality of transistors, a number of the transistors is the same with the number of the sub-wirings, wherein the R control line, the G control line, the B control line are configured to control a transmission of the first driving signals respectively to the R sub-pixel electrode, the G sub-pixel electrode, and the B sub-pixel electrode, and the TP control line is configured to control the transmission of the second driving signals, wherein: a first end of the transistors connects to one sub-wiring, and a control end of the transistors connects to the control line corresponding to the driving signals of the sub-wirings connected to the first end, and a second end of the transistors connects to the sub-pixel electrode or the touch sensor corresponding to the driving signals transmitted by the sub-wiring connected to the first end.

Wherein the first end of the transistor is a collector, the control end of the transistor is a base, and the second end of the transistor is an emitter.

Wherein the display area comprises a plurality of scanning lines and data lines, wherein the data lines are arranged above the scanning lines, a first insulation layer is arranged between the data line and the scanning line, and a second insulation layer is arranged above the data line; and the sub-wiring transmitting the second driving signals to the touch sensor is configured on the same layer with the scanning line, the touch panel further comprises a connecting line arranged on the same layer with the data line, the connecting line passes through a first through hole of the first insulation layer to connect with the sub-wiring transmitting the second driving signals to the touch sensor, and the connecting line passes through a second through hole of the second insulation layer to electrically connect with the touch-driving-signals line of the touch sensor.

Wherein the display area comprises a plurality of scanning lines and data lines, wherein the data lines are arranged above the scanning lines, a first insulation layer is arranged between the data line and the scanning line, and a second insulation layer is arranged above the data line; and the sub-wiring transmitting the second driving signals to the touch sensor is configured on the same layer with the data line, and the connecting line passes through a second through hole of the second insulation layer to electrically connect with the touch-driving-signals line of the touch sensor.

In another aspect, a driving method of touch panels is described. The touch panel comprises a display area and a non-display area, the display area comprises scanning lines, data lines, pixel electrodes, and at least one touch sensor, wherein each of the pixel electrodes comprises a R-subpixel electrode, a G-subpixel electrode, and a B-subpixel electrode, the non-display area comprises a chip area, a fan area, and a multitask demultiplex area, the method including: arranging a driving chip within the chip area, the driving chip including a plurality of pins, at least a portion of the pins outputting first driving signals for controlling the pixel electrodes and outputting second driving signals for controlling the touch sensor; arranging a plurality of wirings corresponding to the pins within the fan area, at least a portion of the wirings being increased from one sub-wiring to four sub-wirings when extending from the fan area to the multitask demultiplex area, wherein three sub-wirings being configured to transmit the first driving signals, and the other sub-wiring being configured to transmit the second driving signals, and configuring four control lines within the multitask demultiplex area, the four control lines including a R control line, a G control line, a B control line, and a TP control line, wherein: when being driven to display, controlling the R control line, the G control line, B control line to output control signals for controlling a transmission of the first driving signals, and turning off the TP control line, the touch sensor of the display area remains a specific voltage, the scanning lines within the display area outputting the scanning signals in sequence, the data line outputting corresponding grayscale signals to control the R sub-pixel electrode, the G sub-pixel electrode, and the B sub-pixel electrode to display; when being driven to touch, turning off the R control line, the G control line, and the B control line, the TP control line outputting control signals for controlling the transmission of second driving signals so as to transmit the second driving signals to the touch sensor.

Wherein the plurality of pins comprises at least one first pin and at least one second pin spaced apart from each other, the first pin only outputs the first driving signals, and the second pin outputs the first driving signals and the second driving signals in a time-sharing manner, a gap density between the first pin and the second pin is configured according to a touch sensibility of the touch panel, and a greater gap density being configured when the touch sensibility of the touch panel is higher.

In view of the above, at least a portion of the pins of the driving chip is configured to provide the first driving signals and the second driving signals in a time-sharing manner. This not only reduces the number of the pins within the driving chip, but also reduces the difficulties of the bonding manufacturing process. At the same time, the number of wirings within the fan area corresponding to the pins is reduced, such that the wirings are not overlapped by each other. In this way, the coupling capacitance between the wirings is reduced, and thus the display performance and the touch sensibility of the touch panel are enhanced.

DETAILED DESCRIPTION OF THE EMBODIMENTS

Embodiments of the invention will now be described more fully hereinafter with reference to the accompanying drawings, in which embodiments of the invention are shown.

Figure 1:
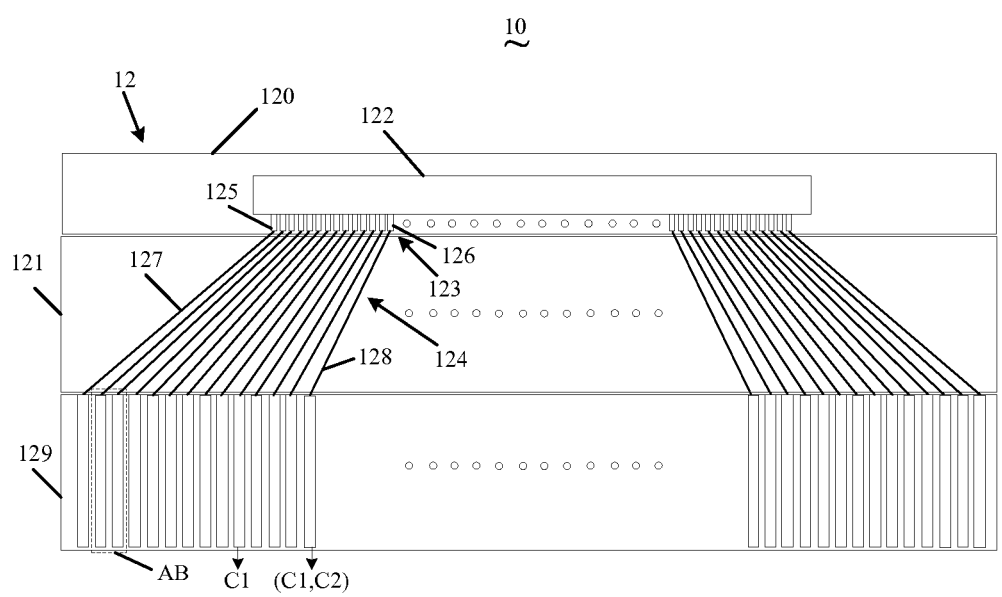
FIG. 1 is a schematic view showing the partial touch panel in accordance with one embodiment.
Figure 2:
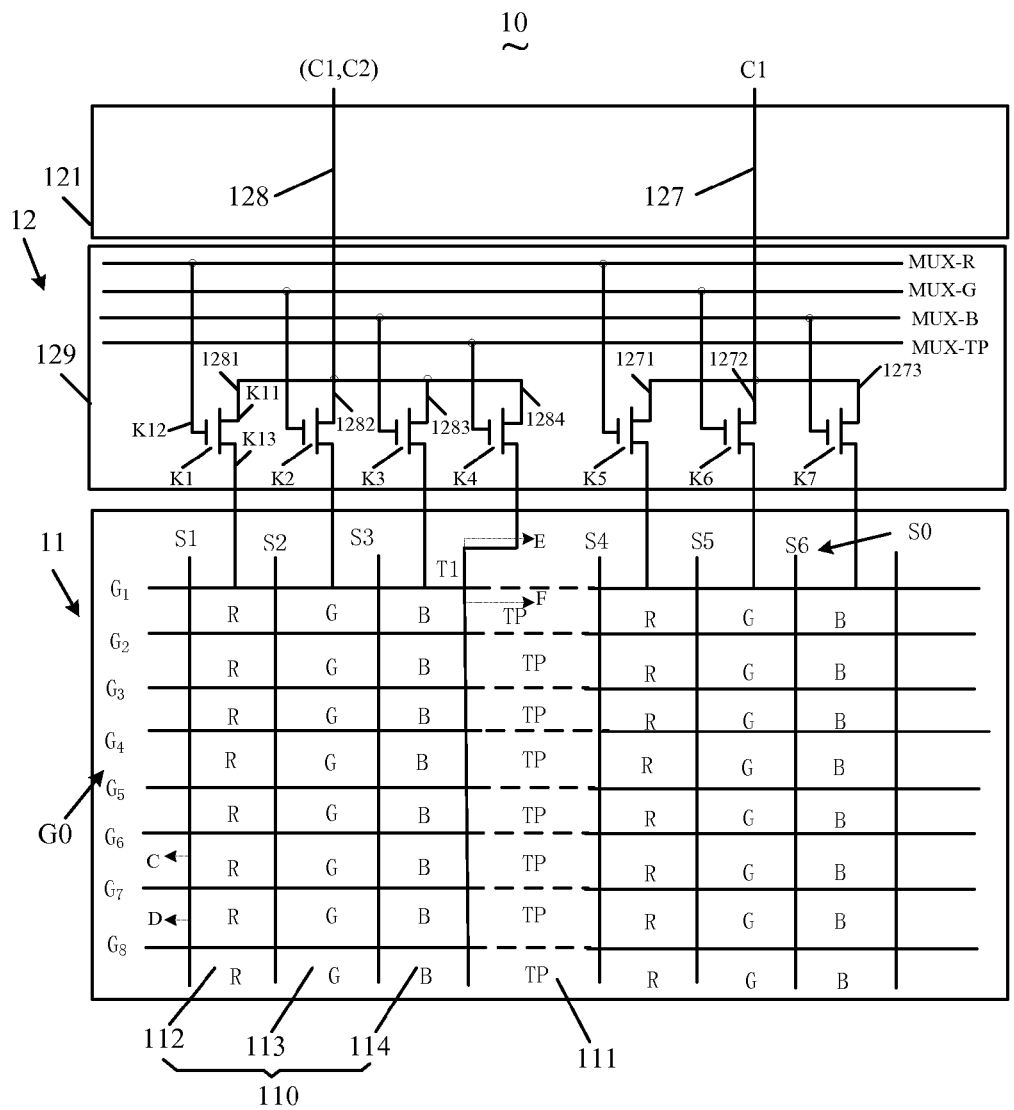
FIG. 2 is a schematic view showing the partial touch panel in accordance with another embodiment.

Referring to FIGS. 1 and 2, FIG. 1 is a schematic view showing the partial touch panel in accordance with one embodiment, and FIG. 2 is a schematic view showing the partial touch panel in accordance with another embodiment. As shown in FIGS. 1 and 2, the touch panel 10 includes a display area 11 and a non-display area 12.

The display area 11 includes a plurality of pixel electrodes 110 and touch sensors 111. The display area 11 includes a plurality of scanning lines (G0), data lines (S0), and a touch-driving-signals line (T1). To simply the descriptions, there are only eight scanning lines (G1-G8), six data lines (S1-S6) and one touch-driving-signals line (T1) are shown in this embodiment. It can be understood that the present disclosure is not limited to the above example. Each of the pixel electrodes 110 includes three subpixel electrodes 112, 113, 114 for respectively display red (R), green (G), and blue (B). Each of the subpixel electrode is provided with scanning signals and grayscale voltage signals via one scanning line (G0) and one data line (S0). The touch sensor 111 is provided with driving signals via the touch-driving-signals line (T1).

The non-display area 12 includes a chip area 120, a fan area 121, and a multitask demultiplex area 129.

The chip area 120 includes a driving chip 122 having a plurality of pins 123. At least a portion of the pins 123 outputs first driving signals (C1) for controlling the pixel electrodes 110 and outputs second driving signals (C2) for controlling the touch sensor 111 in a time-sharing manner.

A plurality of wirings 124 corresponding to the pins 123 are arranged within the fan area 121. The wirings 124 are configured for transmitting the first driving signals (C1) and the second driving signals (C2) outputted by the pins 123.

In the embodiment, at least a portion of the pins 123 of the driving chip 122 may be shared among the first driving signals (C1) and the second driving signals (C2). As such, the number of the pins 123 within the driving chip 122 may be reduced, which also reduces the difficulties of the bonding manufacturing process. At the same time, a reduced number of the wirings 124 corresponding to the pins 123 may be located in the fan area 121. In this way, the wirings 124 within the fan area 121 may be prevented from being overlapped by each other. Not only the coupling capacitance between the wirings 124 may be reduced, but also the display performance and the touch sensibility of the touch panel 10 may be enhanced.

In the embodiment, the plurality of pins 123 includes at least one first pin 125 and at least one second pin 126 spaced apart from each other. The first pin 125 only outputs the first driving signals (C1), and the second pin 126 outputs the first driving signals (C1) and the second driving signals (C2) in the time-sharing manner.

The wirings 124 includes a first wiring 127 and a second wiring 128 respectively connects to the first pin 125 and the second pin 126 for transmitting the driving signals outputted by the first pin 125 and the second pin 126.

A gap density between the first pin 125 and the second pin 126 is configured according to the touch sensibility of the touch panel 10. A greater gap density is configured when the touch sensibility of the touch panel 10 is higher. The gap density between the first pin 125 and the second pin 126 relates to the number of the first pins 125 between two adjacent second pins 126. A greater gap density means that the number of the first pins 125 between two adjacent second pins 126 is smaller. That is, the second pins 126 are densely arranged.

In the embodiment, the gap density between the first pin 125 and the second pin 126 are uniformly distributed. In this way, the touch sensibility of the touch panel 10 may be the same. In other embodiments, the gap density between the first pin 125 and the second pin 126 may be adjusted according to the needed touch sensibility of the touch panel 10. For instance, the touch sensibility of the periphery area of the touch panel 10 may be lower than that of the central area of the touch panel 10. In this example, the gap density between the first pin 125 and the second pin 126 may be configured to be smaller. On the other hand, the gap density between the first pin 125 and the second pin 126 may be configured to be larger for the central area of the touch panel 10.

As the first wiring 127 and the second wiring 128 respectively connects to the first pin 125 and the second pin 126, the gap density between the first wiring 127 and the second wiring 128 is the same with the gap density between the first pin 125 and the second pin 126.

The first wiring 127 and the second wiring 128 pass through the fan area 121 and then enter the multitask demultiplex area 129. FIG. 2 is an enlarged view of the area indicated by "AB" of the multitask demultiplex area 129 of FIG. 1. Within the multitask demultiplex area 129, each of the first wiring 127 includes three sub-wirings 1271, 1272, and 1273 respectively connecting to the R sub-pixel electrode 112, the G sub-pixel electrode 113, and B sub-pixel electrode 114 so as to transmit the first driving signals (C1)

to the R sub-pixel electrode 112, the G sub-pixel electrode 113, and the B sub-pixel electrode 114.

Each of the second wirings 128 includes four sub-wirings 1281, 1282, 1283, and 1284 respectively connecting to the R sub-pixel electrode 112, the G sub-pixel electrode 113, the B sub-pixel electrode 114, and the touch sensor 111 to respectively transmit the first driving signals (C1) to the R sub-pixel electrode 112, the G sub-pixel electrode 113, and the B sub-pixel electrode 114 and to transmit the second driving signals (C2) to the touch sensor 111.

It is to be noted that the sub-wiring 1284 electrically connects to the touch sensor 111 via the touch-driving-signals line (T1). The connection between the sub-wiring 1284 and the touch-driving-signals line (T1) will be described hereinafter.

In the embodiment, the multitask demultiplex area 129 is configured with four control lines, including a R control line (MUX-R), a G control line (MUX-G), a B control line (MUX-B), a TP control line (MUX-TP), and transistors (K1-K7). The number of the transistors (K1-K7) is the same with the number of the sub-wirings (1271-1273, 1281-1284). Wherein the R control line (MUX-R), the G control line (MUX-G), the B control line (MUX-B) control the transmission of the first driving signals (C1) respectively to the R sub-pixel electrode 112, the G sub-pixel electrode 113, and the B sub-pixel electrode 114. The TP control line (MUX-TP) controls the transmission of the second driving signals (C2). A first end of the transistors (K1-K7) connects to one sub-wiring, and a control end of the transistors (K1-K7) connects to the control line corresponding to the driving signals of the sub-wirings connected to the first end. A second end of the transistors (K1-K7) connects to the sub-pixel electrode or the touch sensor corresponding to the driving signals transmitted by the sub-wiring connected to the first end. As the connection for each of the transistors is the same, the connection of the transistor (K1) will be taken as one example to illustrate the connections.

The first end (K11) of transistor (K1) connects to the sub-wiring 1281. The sub-wiring 1281 transmits the first driving signals (C1) to the R sub-pixel electrode 112. In view of the above, R control line (MUX-R) controls the transmission of the first driving signals (C1) to the R sub-pixel electrode 112. Thus, the control end (K12) of the first end (K11) connects to the R control line (MUX-R). The second end (K13) of the first end (K11) connects to the R sub-pixel electrode 112. The first end (K11) of the transistor (K1) may be a collector, the control end (K12) of the transistor (K1) may be a base, and the second end (K13) of the transistor (K1) may be an emitter.

Similarly, the structure and the connection of the transistors (K2-K7) are substantially the same with those of transistor (K1).

Figure 3:
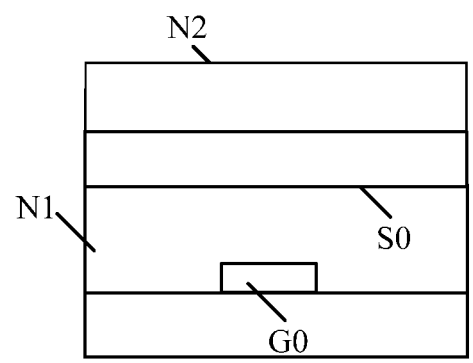
FIG. 3 is a cross sectional view of the display area of FIG. 2 along the dashed line "CD."

In the embodiment, the sub-wiring 1284 transmitting the second driving signals (C2) to the touch sensor 111 passes through the multitask demultiplex area 129 and then connects to the touch-driving-signals line (T1) of the touch sensor 111 via a through hole. The sub-wiring 1284 may be configured on the same layer with the scanning line (G0), or may be configured on the same layer with the data line (S0). FIG. 3 is a cross sectional view of the display area of FIG. 2 along the dashed line "CD." As shown in FIG. 3, the data line (S0) is arranged above the scanning line (G0), and a first insulation layer (N1) is arranged between the data line (S0) and the scanning line (G0). A second insulation layer (N2) is arranged above the data line (S0). Thus, the connection between the sub-wiring 1284 and the touch-driving-signals line (T1) may have two configurations as below.

Figure 4:
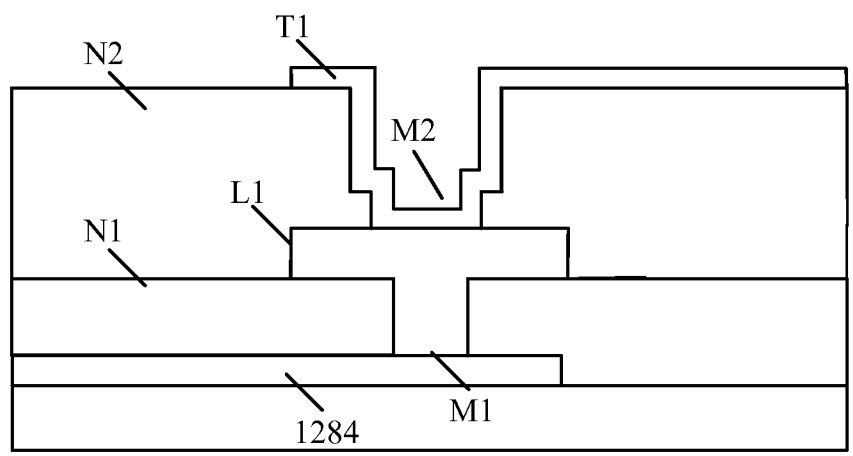
FIG. 4 is a cross sectional view of the display area of FIG. 2 along the dashed line "EF."

The first configuration is shown in FIG. 4, which is a cross sectional view of the display area of FIG. 2 along the dashed line "EF." As shown, the sub-wiring 1284 is shown on the same layer of scanning line (G0). The touch panel 10 further includes a connecting line (L1) arranged on the same layer with data line (S0). The connecting line (L1) passes through a first through hole (M1) of the first insulation layer (N1) to connect with the sub-wiring 1284. In addition, the connecting line (L1) passes through a second through hole (M2) of the second insulation layer (N2) to electrically connect with the touch-driving-signals line (T1).

Figure 5:
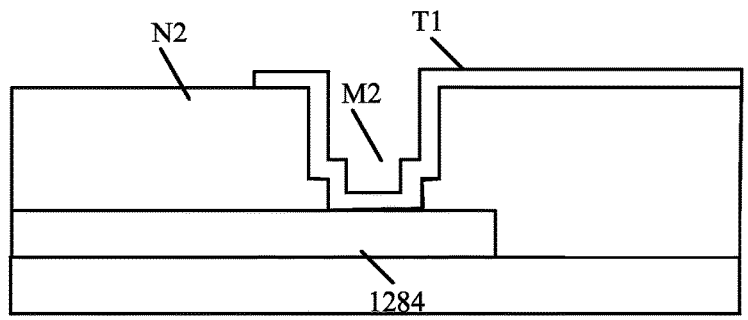
FIG. 5 is a cross sectional view of another structure of the display area of FIG. 2 along the dashed line "EF."

The first configuration is shown in FIG. 5, which is a cross sectional view of another structure of the display area of FIG. 2 along the dashed line "EF." As shown in FIG. 5, the sub-wiring 1284 is arranged on the same layer of data line (S0). The sub-wiring 1284 passes through the second through hole (M2) of the second insulation layer (N2) to electrically connect to the touch-driving-signals line (T1).

It is to be noted that the sub-wiring 1284 is made by the material the same with the wiring on the same layer. For instance, when the sub-wiring 1284 and the scanning line (G0) are on the same layer, preferably, the sub-wiring 1284 is made by the same metal with the scanning line (G0). When the sub-wiring 1284 and the data line (S0) are on the same layer, similarly, the sub-wiring 1284 is made by the same metal with the data line (S0). Thus, the sub-wirings and the scanning/data lines may be manufactured in one shot. The touch-driving-signals line (T1) may be made by metallic or ITO material.

In view of the above, the difficulties of the bonding manufacturing process is reduced. At the same time, the coupling capacitance between the wirings is reduced, and thus the display performance and the touch sensibility of the touch panel 10 are enhanced.

Figure 6:
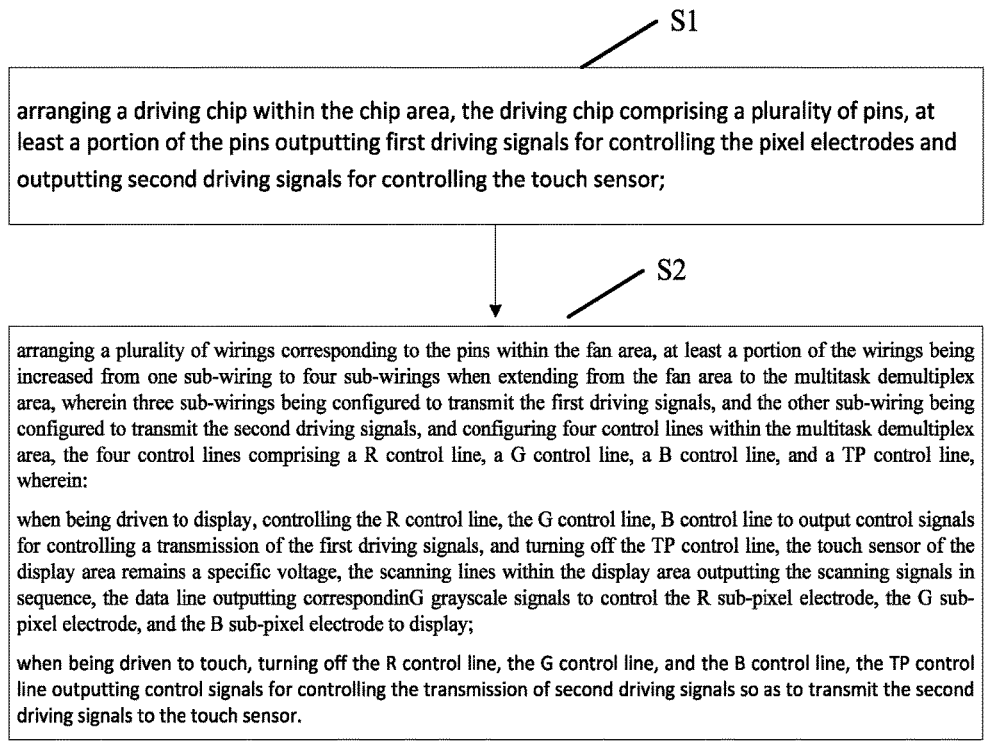
FIG. 6 is a flowchart illustrating a driving method of the touch panel in accordance with one embodiment.
Figure 7:
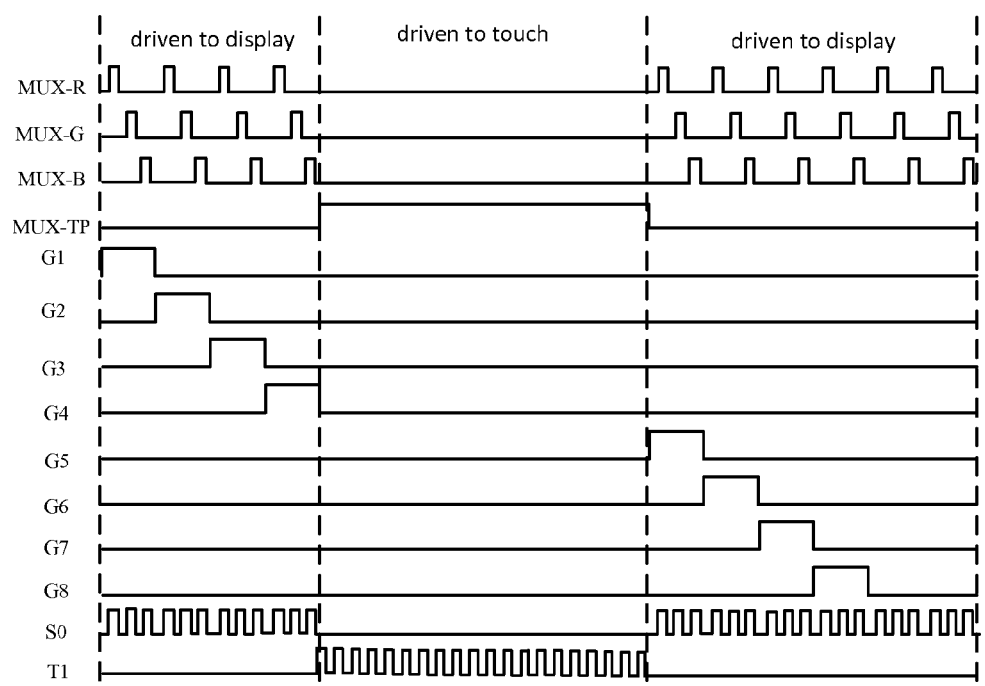
FIG. 7 is a timing waveform diagram corresponding to the driving method of FIG. 6.

According to the present disclosure, a driving method of touch panels may be adopted by the touch panel 10. FIG. 6 is a flowchart illustrating a driving method of the touch panel in accordance with one embodiment. FIG. 7 is a timing waveform diagram corresponding to the driving method of FIG. 6.

Referring to FIGS. 6 and 7, the driving method of the touch panel 10 may include the following steps.

In block S1, the driving chip 122 is arranged within the chip area 120. The driving chip 122 includes a plurality of pins 123. At least a portion of the pins 123 outputs first driving signals (C1) for controlling the pixel electrodes 110 and outputs second driving signals (C2) for controlling the touch sensor.

Specifically, the pins 123 of the driving chip 122 include a first pin 125 and a second pin 126 spaced apart from each other. The first pin 125 only outputs the first driving signals (C1), and the second pin 126 outputs the first driving signals (C1) and the second driving signals (C2). In addition, a gap density between the first pin 125 and the second pin 126 is configured according to the touch sensibility of the touch panel 10. A greater gap density is configured when the touch sensibility of the touch panel 10 is higher. The configuration is described as above.

In block S2, a plurality of wirings 124 corresponding to the pins 123 are arranged within the fan area 121. At least a portion of the wirings 124 may be increased from one sub-wiring to four sub-wirings when extending from the fan area 121 to the multitask demultiplex area 129, wherein three sub-wirings are configured to transmit the first driving signals, and the other sub-wiring is configured to transmit the second driving signals. The multitask demultiplex area 129 is configured with four control lines, including a R control line (MUX-R), a G control line (MUX-G), a B control line (MUX-B), and TP control line (MUX-TP), as shown in FIG. 7.

When being driven to display, the R control line (MUX-R), the G control line (MUX-G), B control line (MUX-B) output control signals and controls the transmission of the first driving signals, and the TP control line (MUX-TP) is turned off. At this moment, the touch sensor 111 of the display area 11 remains a specific voltage. The scanning lines (G1-G8) within the display area 11 outputs the scanning signals in sequence, the data line (S0) outputs corresponding grayscale signals to control the R sub-pixel electrode 112, the G sub-pixel electrode 113, and the B sub-pixel electrode 114 to display.

When being driven to touch, the R control line (MUX-R), the G control line (MUX-G), the B control line (MUX-B) are turned off, and the TP control line (MUX-TP) outputs the control signals and controls the transmission of second driving signals (C2). As such, the TP control line (MUX-TP) transmits the second driving signals (C2) to the touch sensor 111.

In this block, specifically, the wirings 124 includes the first wiring 127 and the second wiring 128 respectively connecting to the first pin 125 and the second pin 126. The first wiring 127 and the second wiring 128 pass through the fan area 121 and then enter the multitask demultiplex area 129. Within the multitask demultiplex area 129, each of the first wiring 127 includes three sub-wirings 1271, 1272, and 1273. Each of the second wirings 128 includes four sub-wirings 1281-1284. The transistors (K1-K7) are arranged within the multitask demultiplex area 129, and the number of the transistors (K1-K7) is the same with the number of the sub-wirings (1271-1273, 1281-1284). The functions of the sub-wirings (1271-1273, 1281-1284) and the connection of the transistors (K1-K7) are the same with the above disclosure.

In the embodiment, during the displaying driving, the first pin 125 and the second pin 126 outputs the first driving signals (C1). That is, the first wiring 127 and the second wiring 128 transmits the first driving signals (C1). Within the multitask demultiplex area 129, the R control line (MUX-R), the G control line (MUX-G), the B control line (MUX-B) outputs the control signals for turning on or off the transistors. The TP control line (MUX-TP) is turned off, and thus no control signals has been outputted. At this moment, the transistors connecting to the R control line (MUX-R), the G control line (MUX-G), B control line (MUX-B) are in a turn-on state. The transistor connecting to the TP control line (MUX-TP) is in a turn-off state. As such, the first driving signals (C1) may be transmitted to the corresponding sub-pixel electrode via the transistor in the turn-on state to control the operations of the sub-pixel electrode. The scanning lines (G1-G8) within the display area 11 outputs the scanning signals in sequence and the data line (S0) outputs corresponding grayscale signals to control the R sub-pixel electrode 112, the G sub-pixel electrode 113, and the B sub-pixel electrode 114 to display.

As the pins 123 has not outputted the second driving signals, the touch sensor 111 within the display area 11 remains a specific voltage. During touch driving, the first pin 125 has not outputted the driving signals, and the second pin 126 outputs the second driving signals (C2). That is, the first wiring 127 has not transmitted the driving signals, and the second wiring 128 transmits the second driving signals (C2). Within the multitask demultiplex area 129, the R control line (MUX-R), the G control line (MUX-G), the B control line (MUX-B) are turned off. That is, the R control line (MUX-R), the G control line (MUX-G), the B control line (MUX-B) have not outputted the control signals. The TP control lines output the control signals to turn on the transistor. At this moment, the transistors connecting to the R control line (MUX-R), the G control line (MUX-G), and the B control line (MUX-B) are in the turn-off state, and the transistor connecting to the TP control line (MUX-TP) is in the turn-on state. In this way, the second driving signals may be transmitted to the corresponding touch-driving-signals line (T1) via the transistor in the turn-on state so as to transit square-wave signals to the touch sensor 111. It is to be noted that the second driving signals is the square-wave signals transmitted to the touch sensor 111.

The displaying driving step and the touch driving step are alternatively executed in sequence to implement the display and touch sensing of the touch panel.

In view of the above, the difficulties of the bonding manufacturing process is reduced. At the same time, the coupling capacitance between the wirings is reduced, and thus the display performance and the touch sensibility of the touch panel 10 are enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A touch panel, comprising:
   a display area and a non-display area, the display area comprising a plurality of pixel electrodes and touch sensors, the non-display area comprising a chip area, and a fan area, wherein:
   the chip area comprising a driving chip having a plurality of pins, at least a portion of the pins outputting first driving signals for controlling the pixel electrodes, and outputting second driving signals for controlling the touch sensor;
   a plurality of wirings corresponding to the pins being arranged within the fan area, and the wirings transmitting the first driving signals and the second driving signals outputted by the pins;
   the plurality of pins comprising at least one first pin and at least one second pin spaced apart from each other, the first pin only outputting the first driving signals, and the second pin outputting the first driving signals and the second driving signals in a time-sharing manner;
   the wirings comprising a first wiring and a second wiring respectively connecting to the first pin and the second pin for transmitting the driving signals outputted by the first pin and the second pin;
   a gap density between the first pin and the second pin being configured according to a touch sensibility of the touch panel, and a greater gap density being configured when the touch sensibility of the touch panel is higher;
   each of the pixel electrodes comprising a R-subpixel electrode, a G-subpixel electrode, and a B-subpixel electrode, the non-display area further comprising a multitask demultiplex area, the first wiring and the second wiring passing through the fan area and entering the multitask demultiplex area, wherein within the multitask demultiplex area:
   each of the first wirings comprising three sub-wirings respectively connecting to the R sub-pixel electrode, the G sub-pixel electrode, and the B sub-pixel electrode so as to transmit the first driving signals to the R sub-pixel electrode, the G sub-pixel electrode, and the B sub-pixel electrode, respectively;

each of the second wirings comprising four sub-wirings respectively connecting to the R sub-pixel electrode, the G sub-pixel electrode, the B sub-pixel electrode, and the touch sensor to respectively transmit the first driving signals to the R sub-pixel electrode, the G sub-pixel electrode, and the B sub-pixel electrode and to transmit the second driving signals to the touch sensor;

wherein the display area comprises a plurality of scanning lines and data lines, wherein the data lines are arranged above the scanning lines, a first insulation layer is arranged between the data line and the scanning line, and a second insulation layer is arranged above the data line;

the sub-wiring transmitting the second driving signals to the touch sensor is configured on the same layer with the scanning line, the touch panel further comprises a connecting line arranged on the same layer with the data line, the connecting line passes through a first through hole of the first insulation layer to connect with the sub-wiring transmitting the second driving signals to the touch sensor, and the connecting line passes through a second through hole of the second insulation layer to electrically connect with a touch-driving-signals line of the touch sensor.

2. The touch panel as claimed in claim 1, wherein the multitask demultiplex area is configured with four control lines, comprising a R control line, a G control line, a B control line, a TP control line, and a plurality of transistors, a number of the transistors is the same with the number of the sub-wirings, wherein the R control line, the G control line, the B control line are configured to control a transmission of the first driving signals respectively to the R sub-pixel electrode, the G sub-pixel electrode, and the B sub-pixel electrode, and the TP control line is configured to control the transmission of the second driving signals, wherein:

a first end of the transistors connects to one sub-wiring, and a control end of the transistors connects to the control line corresponding to the driving signals of the sub-wirings connected to the first end, and a second end of the transistors connects to the sub-pixel electrode or the touch sensor corresponding to the driving signals transmitted by the sub-wiring connected to the first end.

3. The touch panel as claimed in claim 2, wherein the first end of the transistor is a collector, the control end of the transistor is a base, and the second end of the transistor is an emitter.

4. The touch panel as claimed in claim 1, wherein the display area comprises a plurality of scanning lines and data lines, wherein the data lines are arranged above the scanning lines, a first insulation layer is arranged between the data line and the scanning line, and a second insulation layer is arranged above the data line; and the sub-wiring transmitting the second driving signals to the touch sensor is configured on the same layer with the data line, and the connecting line passes through a second through hole of the second insulation layer to electrically connect with the touch-driving-signals line of the touch sensor.

5. A touch panel, comprising:

a display area and a non-display area, the display area comprising a plurality of pixel electrodes and touch sensors, the non-display area comprising a chip area, and a fan area, wherein:

the chip area comprising a driving chip having a plurality of pins, at least a portion of the pins outputting first driving signals for controlling the pixel electrodes and outputting second driving signals for controlling the touch sensor; and a plurality of wirings corresponding to the pins being arranged within the fan area, and the wirings transmitting the first driving signals and the second driving signals outputted by the pins;

wherein the plurality of pins comprising at least one first pin and at least one second pin spaced apart from each other, the first pin only outputs the first driving signals, and the second pin outputs the first driving signals and the second driving signals in a time-sharing manner; and the wirings comprises a first wiring and a second wiring respectively connecting to the first pin and the second pin for transmitting the driving signals outputted by the first pin and the second pin;

wherein each of the pixel electrodes comprising a R-sub-pixel electrode, a G-subpixel electrode, and a B-sub-pixel electrode, the non-display area further comprises a multitask demultiplex area, the first wiring and the second wiring pass through the fan area and enter the multitask demultiplex area, wherein within the multitask demultiplex area:

each of the first wirings comprises three sub-wirings respectively connecting to the R sub-pixel electrode, the G sub-pixel electrode, and the B sub-pixel electrode so as to transmit the first driving signals to the R sub-pixel electrode, the G sub-pixel electrode, and the B sub-pixel electrode, respectively;

each of the second wirings comprises four sub-wirings respectively connecting to the R sub-pixel electrode, the G sub-pixel electrode, the B sub-pixel electrode, and the touch sensor to respectively transmit the first driving signals to the R sub-pixel electrode, the G sub-pixel electrode, and the B sub-pixel electrode and to transmit the second driving signals to the touch sensor;

wherein the display area comprises a plurality of scanning lines and data lines, wherein the data lines are arranged above the scanning lines, a first insulation layer is arranged between the data line and the scanning line, and a second insulation layer is arranged above the data line; and the sub-wiring transmitting the second driving signals to the touch sensor is configured on the same layer with the scanning line, the touch panel further comprises a connecting line arranged on the same layer with the data line, the connecting line passes through a first through hole of the first insulation layer to connect with the sub-wiring transmitting the second driving signals to the touch sensor, and the connecting line passes through a second through hole of the second insulation layer to electrically connect with the touch-driving-signals line of the touch sensor.

6. The touch panel as claimed in claim 5, wherein a gap density between the first pin and the second pin is configured according to a touch sensibility of the touch panel, and a greater gap density is configured when the touch sensibility of the touch panel is higher.

7. The touch panel as claimed in claim 5, wherein the multitask demultiplex area is configured with four control lines, comprising a R control line, a G control line, a B control line, a TP control line, and a plurality of transistors, a number of the transistors is the same with the number of the sub-wirings, wherein the R control line, the G control line, the B control line are configured to control a transmission of the first driving signals respectively to the R sub-pixel electrode, the G sub-pixel electrode, and the B sub-pixel electrode, and the TP control line is configured to control the transmission of the second driving signals, wherein:

a first end of the transistors connects to one sub-wiring, and a control end of the transistors connects to the control line corresponding to the driving signals of the sub-wirings connected to the first end, and a second end of the transistors connects to the sub-pixel electrode or the touch sensor corresponding to the driving signals transmitted by the sub-wiring connected to the first end.

8. The touch panel as claimed in claim 7, wherein the first end of the transistor is a collector, the control end of the transistor is a base, and the second end of the transistor is an emitter.

9. The touch panel as claimed in claim 5, wherein the display area comprises a plurality of scanning lines and data lines, wherein the data lines are arranged above the scanning lines, a first insulation layer is arranged between the data line and the scanning line, and a second insulation layer is arranged above the data line; and the sub-wiring transmitting the second driving signals to the touch sensor is configured on the same layer with the data line, and the connecting line passes through a second through hole of the second insulation layer to electrically connect with a touch-driving-signals line of the touch sensor.

* * * * *